United States Patent
Gill

(10) Patent No.: US 10,246,629 B2
(45) Date of Patent: Apr. 2, 2019

(54) MITIGATION OF CORROSION IN GEOTHERMAL SYSTEMS

(71) Applicant: ECOLAB USA INC., St. Paul, MN (US)

(72) Inventor: Jasbir S. Gill, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 15/602,484

(22) Filed: May 23, 2017

(65) Prior Publication Data

US 2017/0260442 A1    Sep. 14, 2017

Related U.S. Application Data

(62) Division of application No. 14/586,092, filed on Dec. 30, 2014, now Pat. No. 9,688,903.

(51) Int. Cl.
| | | |
|---|---|---|
| C09K 8/54 | (2006.01) | |
| C23F 11/14 | (2006.01) | |
| C23F 11/12 | (2006.01) | |
| C23F 11/10 | (2006.01) | |

(52) U.S. Cl.
CPC .............. *C09K 8/54* (2013.01); *C23F 11/10* (2013.01); *C23F 11/12* (2013.01); *C23F 11/122* (2013.01); *C23F 11/141* (2013.01); *C23F 11/145* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 4,511,480 A | * | 4/1985 | Outlaw | C07F 9/091 252/389.21 |
| 4,608,191 A | | 8/1986 | Wu | |
| 4,614,600 A | * | 9/1986 | Schilling | C09K 8/54 252/391 |
| 4,744,948 A | | 5/1988 | Incorvia | |
| 5,909,774 A | | 6/1999 | Griffith et al. | |

(Continued)

FOREIGN PATENT DOCUMENTS

| | | |
|---|---|---|
| CN | 104003528 A | 8/2014 |
| EP | 2497844 A1 | 9/2012 |

OTHER PUBLICATIONS

International Search Report and Written Opinion for corresponding PCT Application No. PCT/US2015/064583, 10 pages (dated Apr. 10, 2016).

(Continued)

*Primary Examiner* — John J Figueroa
(74) *Attorney, Agent, or Firm* — Eric D. Babych; Brinks Gilson & Lione

(57) ABSTRACT

Corrosion inhibitor blends including one or more ether compounds, one or more quaternary ammonium compounds, and one or more fatty acid amine condensates are disclosed. The corrosion inhibitor blends can be used in methods of inhibiting corrosion of a metallic surface in a geothermal process. In one method, an effective amount of a corrosion inhibitor blend may be added to a production well in a geothermal process. In another method, an effective amount of a corrosion inhibitor blend may be added to a geothermal medium, which could be, for example, steam or liquid brine.

14 Claims, 1 Drawing Sheet

(56) References Cited

U.S. PATENT DOCUMENTS

| | | |
|---|---|---|
| 8,303,768 B2 | 11/2012 | Shevchenko et al. |
| 2006/0180794 A1 | 8/2006 | Goddard et al. |
| 2006/0194700 A1* | 8/2006 | Gatlin .................. C09K 8/22 |
| | | 507/140 |
| 2008/0058229 A1* | 3/2008 | Berkland ............. C09K 8/516 |
| | | 507/211 |
| 2009/0149356 A1 | 6/2009 | Tiwari et al. |
| 2010/0099814 A1* | 4/2010 | Conrad ................ C08F 220/56 |
| | | 524/555 |
| 2013/0081820 A1* | 4/2013 | Falana .................. C09K 8/38 |
| | | 166/308.1 |
| 2013/0161265 A1 | 6/2013 | Fox et al. |
| 2013/0233796 A1 | 9/2013 | Rao et al. |
| 2013/0233804 A1 | 9/2013 | Xie et al. |
| 2014/0277745 A1 | 9/2014 | Keizer et al. |
| 2015/0368544 A1* | 12/2015 | Angman ................ C02F 5/12 |
| | | 507/129 |

OTHER PUBLICATIONS

Nagl, Gary J., "Controlling $H_2S$ emissions in geothermal power plants", *Bulletin d'Hydrogeologie*, 17:393-402 (1999).
Supplementary European Search Report for corresponding European Application No. 15875939.9, 7 pages (dated Jun. 15, 2018).

* cited by examiner

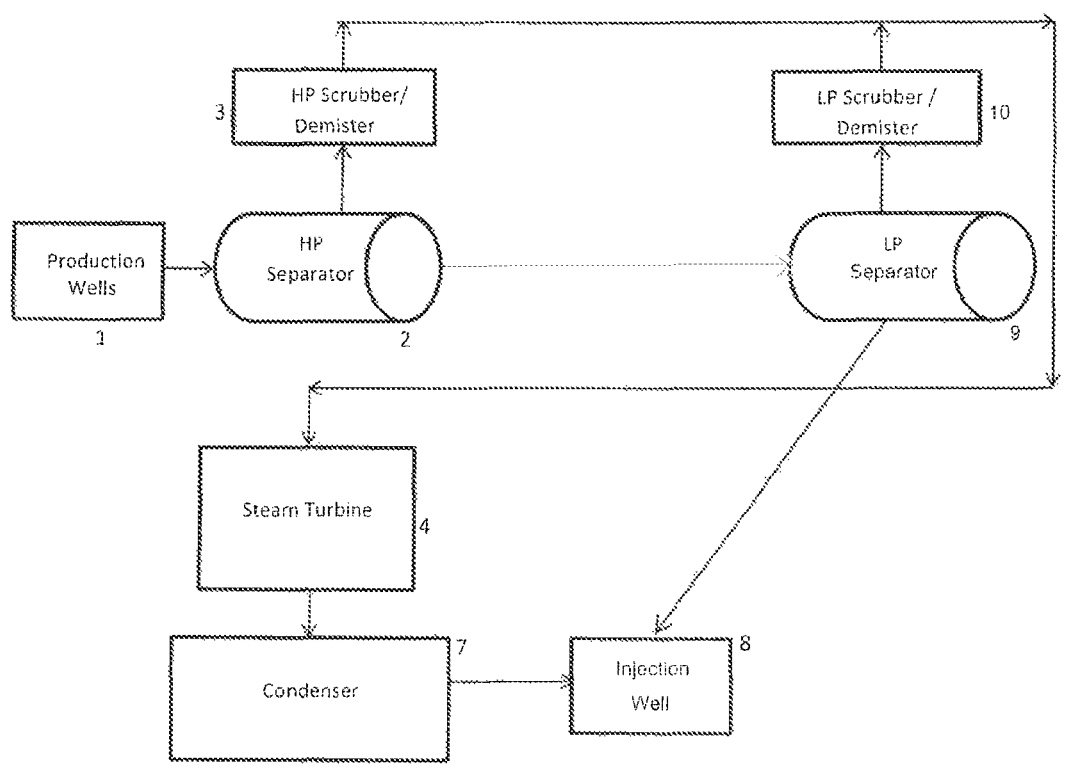

MITIGATION OF CORROSION IN GEOTHERMAL SYSTEMS

BACKGROUND

1. Field of the Invention

The present disclosure generally relates to geothermal power plants. More particularly, the disclosure relates to corrosion inhibitors used in geothermal systems.

2. Description of the Related Art

Geothermal energy is energy in the form of heat within the earth's interior, which is tapped by geothermal wells. Since the earth's interior is extremely hot, there is an enormous potential energy supply. However, there are many technical and economic challenges in optimizing the tapping of this energy source. The use of geothermal energy as a renewable energy source, nonetheless, has gained in importance as other energy sources become less abundant and more expensive.

Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores, which may provide heat reservoirs closer to the surface, and thus a site more accessible to drilling for wells to tap geothermal energy.

Natural geothermal reservoirs, on which many commercial geothermal wells are located, comprise volumes of rock at high temperatures (up to about 350° C. or 622° F.) and often also of high porosity and high permeability to fluids. Wells are drilled into such a reservoir and the thermal energy in the rock is transferred by conduction to a fluid ($H_2O$ as water or steam), which subsequently flows to the well and then up to the earth's surface. In areas where the rock has a low porosity and permeability, it must be artificially fractured by means of explosives or hydrofracturing to provide a network of such fractures, commonly known as Enhanced Geothermal Systems (EGS).

The thermal fluid within the fractures and pores of a reservoir may be almost entirely in a liquid state, which liquid state exists at temperatures much higher than the boiling point of water at atmospheric pressure because of the high pressure of overlying water. Such a reservoir is referred to as a liquid-dominated, or water-dominated, reservoir. When the thermal fluid within larger fractures and pores is in the form of steam, the reservoir is referred to as a vapor-dominated reservoir. A liquid-dominated reservoir may produce either water or a mixture of water and steam. A vapor-dominated reservoir routinely produces only steam, and in most instances the produced steam is super-heated steam.

In the geothermal production of electricity from a water-dominated reservoir, the pressurized hot water or wet steam produced from a well is flashed to a lower pressure at the earth's surface, separating steam or converting the water partly to steam, and this steam is used to drive a conventional turbine-generator set. In a relatively rare vapor-dominated reservoir, the superheated steam may be piped directly to the turbine without the separation of water.

Many geothermal wells for the production of electricity are water-dominated hydrothermal convection systems characterized by the circulation of surface water, including wastewaters and/or condensates, downhole. The driving force of the convection systems is gravity, the cold downward-moving recharge water being much denser than the heated, upward-moving thermal water. The technique of reinjection of wastewaters or condensates back into the wells may be used for a number of reasons, including avoidance of surface disposal of such waters which may contain pollutants. Selective injection or reinjection of water into the thermal system may help to retain aquifer pressures and to extract more geothermal energy from the rock than is possible when fresh geothermal water is itself the main produced fluid. The produced fluid is either magmatic (released from solidifying magma), meteoric (rain and snow), or a mixture of the two, and may be fresh, reinjected, or a mixture of the two.

Geothermal steam is generally used as the energy source, regardless of whether the produced fluid is steam, partly steam, or water that is partly converted to steam flash evaporation. Geothermal steam is used in power generation as well as heating and electrical processes. Geothermal steam temperatures range from about 185° C. to about 370° C. (about 365° F. to about 700° F.), have a salinity from less than 1000 ppm up to several hundred thousand ppm, and a content of non-condensable gases (NCG) up to about 6 percent. Much higher temperature fluids can be extracted from the ground using deeper wells.

While geothermal power plants remain attractive from an environmental perspective, corrosion control in geothermal power production is a major hurdle in advancing the use of this renewable source of energy. Among the many challenges is the variability of brine chemistry, the use of multiple wells, the temperature, NCG, and the materials used in the process. In hot-brine based geothermal plants, pH modification processes are used to prevent silica scale formation on the surface equipment and injection wells. The scale prevention methods for the pH modification process include reducing the pH of the brine by adding mineral acid, such as hydrochloric acid (HCl) to achieve a pH of about 4.5 to about 5. The mineral acid may be added at a location between the high pressure separator and the low pressure separator. In the low pressure separator, the pH may be further lowered to about 2.5.

The low pH environment is conducive to corrosion, in addition to the high temperatures, high total dissolved solids (TDS), and dissolved gasses such as $H_2S$ and $CO_2$.

BRIEF SUMMARY

The present disclosure generally relates to methods and compositions for corrosion control. In one embodiment, a method of inhibiting corrosion of a metallic surface in a geothermal process is disclosed. The method comprises adding an effective amount of a corrosion inhibitor blend to a production well in a geothermal process, wherein the corrosion inhibitor blend comprises an ether compound, a quaternary ammonium compound, and a fatty acid amine condensate.

In another embodiment, a method of inhibiting corrosion of a metallic surface in a geothermal process is disclosed. The method comprises adding an effective amount of a corrosion inhibitor blend to a geothermal medium, wherein the corrosion inhibitor blend comprises an ether compound, a quaternary ammonium compound, and a fatty acid amine condensate.

In a further embodiment, a corrosion inhibitor blend is disclosed, which comprises an ether compound, a quaternary ammonium compound, and a fatty acid amine condensate.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 depicts a flowchart including examples of components that may be used in a geothermal power plant.

DETAILED DESCRIPTION

Various embodiments are described below. The relationship and functioning of the various elements of the embodiments may better be understood by reference to the following detailed description. However, embodiments are not limited to those explicitly described below.

Geothermal power plants may be used to convert the earth's heat into electricity. A geothermal process makes use of the water and sediments beneath the earth's surface. Specifically, magma from earth's core rises and meets the water-rich sediments, thereby heating the water. As the water is heated and moved through the formation, it dissolves minerals and thereby forms a brine. The mineral-rich brine that contains a large amount of heat becomes a useable resource for energy generation. However, as will be further explained below, the brine contains scale and/or corrosion causing substances, such as hydrogen sulfide, carbon dioxide, iron sulfide, ammonia, etc., that need to be controlled. Additionally, certain conditions associated with geothermal production enhance corrosion, such as high temperatures.

Corrosion may lead to equipment damage, equipment failure, leaks and spills, well and pipeline plugging, reduced flow of brine and/or steam, reduced levels of power production, and even overall system failures leading to a partial or complete shutdown of the geothermal plant. The presently disclosed corrosion inhibitors may eliminate, or at least substantially mitigate, many, if not all, of the aforementioned problems.

In some embodiments, the corrosion inhibitor is a synergistic blend of chemicals. In one embodiment, the corrosion inhibitor is a blend of chemicals comprising one or more ether compounds, one or more quaternary ammonium compounds, and one or more fatty acid amine condensates.

The ether component of the corrosion inhibitor blend is not particularly limited. In some embodiments, the ether component has both an ether and an alcohol functional group in the same molecule. Illustrative, non-limiting examples of suitable ether compounds are selected from butoxyethanol (glycol ether), ethylene glycol monopropyl ether, ethylene glycol monobutyl ether, and any combination thereof.

The one or more ether compounds may be included in the corrosion inhibitor blend in an amount ranging from about 10% to about 50%, based on the total weight of the corrosion inhibitor blend. In one embodiment, the one or more ether compounds are included in the corrosion inhibitor blend in an amount ranging from about 10% to about 15%. In another embodiment, the one or more ether compounds are included in the corrosion inhibitor blend in an amount ranging from about 15% to about 20%. In an additional embodiment, the one or more ether compounds are included in the corrosion inhibitor blend in an amount ranging from about 20% to about 25%. In still another embodiment, the one or more ether compounds are included in the corrosion inhibitor blend in an amount ranging from about 25% to about 30%. In a further embodiment, the one or more ether compounds are included in the corrosion inhibitor blend in an amount ranging from about 35% to about 40% or about 45% to about 50%.

The quaternary ammonium component of the corrosion inhibitor blend is not particularly limited. Any quaternary ammonium compounds may be used. Illustrative, non-limiting examples of suitable quaternary ammonium compounds are selected from benzyldimethyldodecylammonium chloride, benzyldimethyltetradecylammonium chloride, benzyldimethylhexadecylammonium chloride, benzyldimethyloctadecyl ammonium chloride, and any combination thereof.

The one or more quaternary ammonium compounds may be included in the corrosion inhibitor blend in an amount ranging from about 30% to about 60%, based on the total weight of the corrosion inhibitor blend. In one embodiment, the one or more quaternary ammonium compounds are included in the corrosion inhibitor blend in an amount ranging from about 35% to about 40%. In another embodiment, the one or more quaternary ammonium compounds are included in the corrosion inhibitor blend in an amount ranging from about 40% to about 45%. In a further embodiment, the one or more quaternary ammonium compounds are included in the corrosion inhibitor blend in an amount ranging from about 35% to about 45% or about 50% to about 60%.

The fatty acid amine condensate component of the corrosion inhibitor blend is not particularly limited. Fatty acid amine condensates are the reaction products produced by reacting fatty acids with amines. Any amine may be used and any fatty acid may be used. Illustrative, non-limiting examples of fatty acids are carboxylic acids with long hydrocarbon chains, the hydrocarbon chains generally having from about 10 to about 30 carbon atoms. The fatty acids may be both saturated and unsaturated. In some embodiments, the fatty acids are selected from tall oil fatty acid, lauric acid, stearic acid, phosphate esters, propenoic acid, oleic acid, and any combination thereof. While any amine may be used in the reaction with a fatty acid to form the fatty acid amine condensates, an illustrative example is aminoethyl-1,2-ethanediamine (1,2-Ethanediamine, N-(2-aminoethyl)-). In one embodiment, the fatty acid amine condensate is the reaction product of aminoethyl-1,2-ethanediamine with propenoic acid.

The one or more fatty acid amine condensate compounds may be included in the corrosion inhibitor blend in an amount ranging from about 10% to about 30%, based on the total weight of the corrosion inhibitor blend. In one embodiment, the one or more fatty acid amine condensate compounds are included in the corrosion inhibitor blend in an amount ranging from about 10% to about 15%. In another embodiment, the one or more fatty acid amine condensate compounds are included in the corrosion inhibitor blend in an amount ranging from about 15% to about 20%. In a further embodiment, the one or more fatty acid amine condensate compounds are included in the corrosion inhibitor blend in an amount ranging from about 20% to about 25% or about 25% to about 30%.

While the one or more ether compounds, one or more quaternary ammonium compounds, and one or more fatty acid amine condensates are not particularly limited, in certain embodiments, the corrosion inhibitor blend may comprise from about 20% to about 25% by weight tall oil fatty acid reaction products with n-(2-aminoethyl)-1-2 ethanediamine and 2-propenoic acid. In some embodiments, the blend may comprise about 35% to about 45% by weight 2-Butoxyethyl alcohol and methyl alcohol. In certain embodiments, the blend may comprise about 25% to about 35% by weight benzyl-dimethyl-dodecyl ammonium chloride, about 5% to about 15% by weight benzyl-dimethyl-tetradecyl ammonium chloride, about 0.5% to about 5% by weight benzyl-dimethyl-hexadecyl ammonium chloride, and about 0.5% to about 5% by weight benzyl-dimethyl-octadecyl ammonium chloride.

In the processes of using the presently disclosed corrosion inhibitor blends, the amount of corrosion inhibitor blend is not particularly limited and will generally depend upon the type of process being used, the contents of the liquids or gasses, and the conditions of the process. If the liquids contain high amounts of carbon dioxide, for example, than a corresponding high amount of corrosion inhibitor blend may be added.

In general, the corrosion inhibitor blend may be added to the system in an amount ranging from about 1 ppm to about 100 ppm. In one embodiment, the amount of corrosion inhibitor blend added to the system is from about 2 ppm to about 50 ppm. In another embodiment, the amount of the corrosion inhibitor blend added to the system ranges from about 5 ppm to about 30 ppm.

The corrosion inhibitor blend may be added to the system all at once, it may be divided up and added periodically during a predetermined time interval, it may be added continuously to the system, or it may be added according to any other dosing regimen. Additionally, a first corrosion inhibitor blend may be added at one location in the system and a second corrosion inhibitor blend may be added at a different location in the system. The first and second corrosion inhibitor blends may comprise the same chemistry or they may have different formulations that fall within the corrosion inhibitor blend parameters disclosed herein. Any number of corrosion inhibitor blends may be used in a given system, such as a geothermal system, and each blend may be added at a different location throughout the system. Again, the blends may comprise the same chemistry or they may have different formulations that fall within the corrosion inhibitor blend parameters disclosed herein. Addition of the corrosion inhibitor blend to the system may be manual or it may be added according to an automated process.

With respect to FIG. 1, production wells (1) may be drilled into the earth to tap into the reservoirs to supply a power plant with steam and injection wells (8) may be drilled into the earth to tap into the reservoirs to recharge the reservoir with cooled, geothermal brine.

In a more detailed aspect, the brine is transported from the reservoir within the earth to the surface. It flows through the well (1) to the well head where it is then directed through a pipeline to a high pressure steam separator (2) in the power plant. The high pressure stream separator separates steam from the liquid brine. Steam flows out of the separator through a pipeline to the steam scrubber (3). Steam may contain natural impurities, such as minerals, NCG, and condensate. A steam scrubber (3) may be used to wash the water and the minerals from the steam and also to purge the NCG. Clean steam then flows through a pipeline to the steam turbine/generator set(s) (4), which creates electrical energy.

In some embodiments, the liquid brine may flow through a pipeline from the high pressure separator (2) to a standard pressure crystallizer (not shown), which again separates steam from liquid brine. The steam may be transported through a pipeline to a scrubber (not shown) where it is cleaned then transported through a pipeline to the turbine (4). Liquid brine remaining in the standard pressure crystallizer may be transported through a pipeline to a low pressure steam separator (9) which generates additional low pressure steam that can be transported through a pipeline to a steam scrubber (10). From the steam scrubber (10), the steam may be transported through a pipeline to the turbine (4). The remaining liquid brine in the low pressure steam separator (9) may be transported through a pipeline back into the injection well (8) or it may be transported to a clarifier tank to remove silica, for example, from the brine. A pipeline can then transport the cleaned brine from the clarifier tank into the injection well (8) to be reheated and repressurized by the energy of the earth.

As a final step, steam from the turbine (4) may be condensed into liquid in a condenser (7) and the liquid can be transported through a pipeline into the injection well (8).

The above description merely illustrates some common equipment used in geothermal systems and the corrosion inhibitors disclosed herein are not limited to the above-described processes. For example, some geothermal processes do not include the standard pressure crystallizer and/or the clarifier tank. In those systems, mineral acid, such as HCl, may be used to control certain scale causing substances, such as silica. The addition of mineral acid, however, may enhance the corrosion issues in the operation.

As impurities and corrosion causing substances, such as hydrogen sulfide, carbon dioxide, ammonia, etc., are initially contained in the brine downhole, these substances are carried with the brine to the surface and through the processes described above, unless they are controlled. All of the aforementioned components included in a geothermal process may comprise metal or metallic surfaces and thus, they are susceptible to corrosion. Further, the wells, such as the production wells, include well casings that extend from the well head into the well, but generally do not extend to the bottom of the well. These well casings may comprise metal or metallic surfaces and thus, they are susceptible to corrosion.

The present disclosure is intended to cover the treatment of corrosion and/or scale causing species not only in steam and brine, but in any medium, such as any fluid used in a geothermal production process. Moreover, the injection point of the corrosion inhibitor is not limited to any specific location. For example, in one embodiment, the corrosion inhibitor can be injected into the production well. In another embodiment, the corrosion inhibitor may be added into the pipeline that transports liquid brine into the injection well. Illustrative, non-limiting examples of locations where the corrosion inhibitor may be added are the production well, the high pressure steam separator, the standard pressure crystallizer, the low pressure steam separator, the condenser, the clarifier tank, the injection well, and any pipeline in a geothermal process that is used to transport steam or a geothermal fluid, such as liquid brine.

In accordance with all embodiments disclosed in the present application, injection of chemicals, such as corrosion inhibitors, may be carried out using manual injection or automated injection. Chemical injection pumps may be used to pump corrosion inhibitors from storage tanks into the geothermal process. For example, a corrosion inhibitor storage tank may be located on-site at the geothermal facility. The storage tank may include a conduit that extends from the storage tank downhole into the production well. A chemical injection pump may be operatively connected with the storage tank such that when activated, the pump facilitates the transport of corrosion inhibitor from the storage tank into the production well. In some embodiments, a plurality of storage tanks may be used, each storing one or more corrosion inhibitors and each associated with a chemical injection pump and a conduit leading to a location in the geothermal system.

For example, one storage tank may be used to supply corrosion inhibitor into the production well and a different storage tank may be used to supply corrosion inhibitor into the injection well. Additionally, a third storage tank may be employed to supply corrosion inhibitor to a pipeline in the system, such as the pipeline between the high pressure steam separator and the low pressure steam separator.

In some embodiments, components of the steam and/or brine may be monitored. For example, the dissolved gas content (such as dissolved hydrogen sulfide and/or dissolved carbon dioxide) of a NCG stream, a condensate stream, a brine stream, etc., may be monitored using one or more sensors. If the sensors detect a level of corrosion causing substance, such as carbon dioxide above a threshold level, then an electronic signal may be sent to one or more chemical injection pumps to inject corrosion inhibitor into the geothermal system at one or more of the aforementioned locations.

The system may include a monitoring and controlling unit that comprises a controller device and a plurality of sensors. Each of the plurality of sensors may be configured to obtain a different characteristic of the fluids/steam (such as carbon dioxide content, hydrogen sulfide content, etc.) and each sensor may be in communication with the controller.

Based on signals received from the sensors, the controller may send signals to the one or more chemical injection pumps, which are in fluid communication with various corrosion inhibitors. The signals may turn the pumps off (causing them to stop adding corrosion inhibitor) or turn the pumps on (causing them to add a specified amount of corrosion inhibitor). In other embodiments, a steady supply of corrosion may be continuously be added to the system. The components of this automated system may be in communication with each other in any number of ways, including, as illustrative examples, through any combination of wired connection, a wireless connection, electronically, cellularly, through infrared, satellite, or according to any other types of communication networks, topologies, protocols, and standards.

As used herein, the term "controller" or "controller device" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

The disclosed monitoring and controlling system provides methods to generate real-time, on-line, reliable data from the steam/fluids. Based upon the data received by the controller from the plurality of sensors, real-time adjustments can be made to the system. For example, the plurality of sensors may provide continuous or intermittent feedback, feed-forward, or predictive information to the controller, which can relay this information to a relay device, such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the chemical injection pumps. The information may also be processed internally by the controller and the controller can automatically send signals to the pumps, to adjust the amount of chemical injection. Based upon the information received by the controller from the plurality of sensors or from the remote device, the controller can transmit signals to the various pumps to make automatic, real-time adjustments, to the amount of corrosion inhibitor that the pumps are injecting into the production well, for example.

In certain aspects, the remote device or controller can include appropriate software to receive data from the plurality of sensors and determine if the data indicates that one or more measured properties, such as hydrogen sulfide content, are within, or outside, an acceptable range. The software can also allow the controller or remote device to determine appropriate actions that should be taken to remedy the property that is outside of the acceptable range. The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis.

Data transmission of measured properties or signals to chemical pumps, alarms, remote monitoring devices, such as computers or cellular telephones, or other system components is accomplished using any suitable device, and across any number of wired and/or wireless networks, including as illustrative examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

Various additional automated methods that can be used in accordance with the present disclosure for monitoring and controlling industrial systems are disclosed in U.S. Pat. No. 8,303,768, U.S. Patent Application Publication No. 2013/0161265, U.S. Patent Application Publication No. 2013/0233804, U.S. Patent Application Publication No. 2013/0233796, and U.S. Ser. No. 13/833,115, the contents of each of these documents being incorporated by reference into the present application in their entirety.

In accordance with the foregoing, it can be seen that corrosion of the metallic components or surfaces in contact with corrosion causing substances or conditions in a geothermal process can be properly mitigated or inhibited through the use of the presently disclosed corrosion inhibitors and the optional automated system disclosed herein.

While the presently disclosed corrosion inhibitor treatment methods have been disclosed in connection with geothermal power plants, it is envisioned that the treatment methods may be used in any industrial setting where corrosion inhibition is desired, such as in oil and gas refineries. Therefore, the present treatment methods are applicable to all mediums that contain corrosion causing substances or conditions.

EXAMPLES

Wheel test procedures were carried out to determine the effectiveness of the presently disclosed corrosion inhibitor blends.

Philippine brine was used and hydrogen sulfide at 400 psi and carbon dioxide at 400 psi was added thereto. The pH of the brine was adjusted to about 3.5 for 24 hours at 260° C. With respect to the inhibited systems, the test coupons were pretreated with the corrosion inhibitor blend. This inhibitor blend corresponds to "TX" in Table 1. The pretreatment conditions involved saturating the brine with $H_2S$ at 180° C. for 48 hours in the presence of 100 ppm of the corrosion inhibitor blend. The chemical composition "TX" comprises about 22% by weight tall oil fatty acid reaction products with n-(2-aminoethyl)-1-2 ethanediamine and 2-propenoic acid, about 39% by weight 2-Butoxyethyl alcohol and methyl alcohol, about 27% by weight benzyl-dimethyl-dodecyl ammonium chloride, about 9% by weight benzyl-dimethyl-tetradecyl ammonium chloride, about 2% by weight benzyl-dimethyl-hexadecyl ammonium chloride, and about 1% by weight benzyl-dimethyl-octadecyl ammonium chloride.

The test coupons were ¼×7⅜" 1018 Mild Steel coupons with a sandblast finish. Each coupon was placed in a 7½ oz. bottle and remained stationery throughout the duration of the test. The initial weight of the coupon was recorded prior to conducting the tests.

Using a total volume of 100 ml per bottle, fluids are siphoned with a flow of prescribed gas to displace any air in the bottle which could mix with the corrosive fluids being poured. Bottles are filled to the desired water/oil ratio.

The corrosion inhibitor blend was added to the bottles. Concentrations are based on the total fluids in the bottle (100 ml). A pipette or a syringe was used to introduce the inhibitor to the fluid. Higher concentrations of inhibitor were added neat. Lower concentrations of inhibitor were diluted to achieve the desired ppm. The prepared coupons were dropped into the bottles filled with fluids and inhibitor blend. The bottles were then capped under a blanket of prescribed gas to displace air in the vapor phase of the test bottle. Bottles were loaded on a wheel oven apparatus. The wheel oven was preheated and set on the desired temperature. The bottles were spun on the wheel at 26 rpm for one hour for the film cycle. When the film cycle was complete, the bottles were removed from the wheel oven and the coupons were transferred to new bottles with fresh fluids (a volume of 100 ml). Bottles were capped with a blanket of prescribed gas and loaded back onto the wheel oven and spun for one hour for the rinse cycle. When the rinse cycle was complete, the bottles were removed from the wheel oven and the coupons were transferred to new bottles with fresh fluids (a volume of 200 ml). Bottles were capped with a blanket of prescribed gas and loaded back onto the wheel oven and spun for 24 hours for the final exposure cycle. At the end of the final exposure cycle, the bottles were removed from the wheel oven. The coupons were removed from the bottles and cleaned with inhibited acid. They were re-weighed and percent protection was calculated from the average weight loss of the coupons in the uninhibited bottles. Table 1 lists the results of the tests.

TABLE 1

| Coupon | Length Hours | Brine Ml. | Inhibitor ppm | Weight Loss Mg. | MPY | % Protection | Inhibitor |
|---|---|---|---|---|---|---|---|
| 1 | 24 | 50.0 | 0 | 60.0 | 36.60 | 0% | BLANK |
| 2 | " | " | 0 | 61.2 | 37.33 | 0% | BLANK |
| 3 | " | " | 0 | 60.7 | 37.03 | 0% | BLANK |
| 4 | 48/24 | 200.0/50.0 | 100/5 | 71.0 | 14.48 | 61% | TX |
| 5 | " | " | " | 78.8 | 16.08 | 57% | TX |
| 6 | " | " | " | 74.1 | 15.12 | 59% | TX |
| 7 | " | " | 100/20 | 67.8 | 13.83 | 63% | TX |
| 8 | " | " | " | 65.9 | 13.44 | 64% | TX |
| 9 | " | " | " | 61.0 | 12.44 | 66% | TX |

As can be seen from the data, the presently disclosed corrosion inhibitor blends achieve high rates of corrosion protection.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" or "an" is intended to include "at least one" or "one or more." For example, "an ether compound" is intended to include "at least one ether compound" or "one or more ether compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A corrosion inhibitor blend comprising an ether compound, a quaternary ammonium compound, and a fatty acid amine condensate, wherein the quaternary ammonium compound is selected from the group consisting of benzyldimethyldodecylammonium chloride, benzyldimethylhexadecylam monium chloride, benzyldimethyloctadecyl ammonium chloride, and any combination thereof.

2. The corrosion inhibitor blend of claim 1, wherein the ether compound is selected from the group consisting of butoxyethanol, ethylene glycol monopropyl ether, ethylene glycol monobutyl ether, and any combination thereof.

3. The corrosion inhibitor blend of claim 1, wherein the fatty acid amine condensate is prepared by reacting an amine with a fatty acid comprising a carboxylic acid and a hydrocarbon chain comprising about 10 to about 30 carbon atoms.

4. The corrosion inhibitor blend of claim 3, wherein the fatty acid is selected from the group consisting of tall oil fatty acid, lauric acid, stearic acid, phosphate esters, propenoic acid, oleic acid, and any combination thereof.

5. The corrosion inhibitor blend of claim 3, wherein the amine is aminoethyl-1,2-ethanediamine.

6. The corrosion inhibitor blend of claim 1, wherein the ether compound comprises an alcohol functional group.

7. The corrosion inhibitor blend of claim 1, wherein the corrosion inhibitor blend comprises about 10% to about 30%, by weight, of the ether compound.

8. The corrosion inhibitor blend of claim 1, wherein the corrosion inhibitor blend comprises about 50% to about 60%, by weight, of the quaternary ammonium compound.

9. The corrosion inhibitor blend of claim 1, wherein the corrosion inhibitor blend comprises about 10% to about 20%, by weight, of the fatty acid amine condensate.

10. A corrosion inhibitor blend comprising an ether compound, quaternary ammonium compounds, and a fatty acid amine condensate, wherein the quaternary ammonium compounds are a combination of at least two quaternary ammonium compounds selected from the group consisting of benzyldimethyldodecylammonium chloride, benzyldimethyltetradecylammonium chloride, benzyldimethylhexadecylam monium chloride, and benzyldimethyloctadecyl ammonium chloride.

11. The corrosion inhibitor blend of claim 10, wherein the quaternary ammonium compounds are a combination of at least three quaternary ammonium compounds selected from the group consisting of benzyldimethyldodecylammonium chloride, benzyldimethyltetradecylammonium chloride, benzyldimethylhexadecylam monium chloride, and benzyldimethyloctadecyl ammonium chloride.

12. The corrosion inhibitor blend of claim 10, wherein the ether compound is selected from the group consisting of butoxyethanol, ethylene glycol monopropyl ether, ethylene glycol monobutyl ether, and any combination thereof.

13. The corrosion inhibitor blend of claim 10, wherein the fatty acid amine condensate is prepared by reacting an amine with a fatty acid comprising a carboxylic acid and a hydrocarbon chain comprising about 10 to about 30 carbon atoms.

14. The corrosion inhibitor blend of claim 13, wherein the fatty acid is selected from the group consisting of tall oil fatty acid, lauric acid, stearic acid, phosphate esters, propenoic acid, oleic acid, and any combination thereof.

* * * * *

UNITED STATES PATENT AND TRADEMARK OFFICE
CERTIFICATE OF CORRECTION

PATENT NO. : 10,246,629 B2  
APPLICATION NO. : 15/602484  
DATED : April 2, 2019  
INVENTOR(S) : Jasbir S. Gill It is certified that error appears in the above-identified patent and that said Letters Patent is hereby corrected as shown below:

In the Claims

In Column 11, Claim 1, Line 16-17, delete "benzyldimethylhexadecylam monium" and insert -- benzyldimethylhexadecylammonium --, therefor.

In Column 12, Claim 10, Line 14-15, delete "benzyldimethylhexadecylam monium" and insert -- benzyldimethylhexadecylammonium --, therefor.

In Column 12, Claim 11, Line 22, delete "benzyldimethylhexadecylam monium" and insert -- benzyldimethylhexadecylammonium --, therefor.

Signed and Sealed this  
Seventeenth Day of September, 2019

Andrei Iancu  
*Director of the United States Patent and Trademark Office*